United States Patent
Grabowska et al.

(10) Patent No.: US 10,215,136 B2
(45) Date of Patent: Feb. 26, 2019

(54) ADJUSTABLE, LOW LOSS VALVE FOR PROVIDING HIGH PRESSURE LOOP EXHAUST GAS RECIRCULATION

(71) Applicant: BorgWarner Inc., Auburn Hills, MI (US)

(72) Inventors: David Grabowska, Asheville, NC (US); Rajmohan Chandramohanan, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/326,857

(22) PCT Filed: Aug. 14, 2015

(86) PCT No.: PCT/US2015/045281
§ 371 (c)(1),
(2) Date: Jan. 17, 2017

(87) PCT Pub. No.: WO2016/032775
PCT Pub. Date: Mar. 3, 2016

(65) Prior Publication Data
US 2017/0211522 A1    Jul. 27, 2017

Related U.S. Application Data

(60) Provisional application No. 62/041,844, filed on Aug. 26, 2014.

(51) Int. Cl.
*F02M 26/70* (2016.01)
*F01D 17/14* (2006.01)
(Continued)

(52) U.S. Cl.
CPC ............. *F02M 26/70* (2016.02); *F01D 17/14* (2013.01); *F02B 37/18* (2013.01); *F02B 37/183* (2013.01);
(Continued)

(58) Field of Classification Search
CPC ........ F02B 37/183; F02B 37/18; F02B 37/22; F02B 39/00; Y02T 10/144; F01D 17/14;
(Continued)

(56) References Cited

U.S. PATENT DOCUMENTS 3,945,398 A * 3/1976 Masheder ............... F16K 1/222
137/527.8
3,981,285 A * 9/1976 Schueler ................... F02D 1/00
123/383
(Continued)

FOREIGN PATENT DOCUMENTS

WO    2005061870 A1    7/2005

OTHER PUBLICATIONS

International Search Report and Written Opinion; dated Oct. 23, 2015; for International Application No. PCT/US2015/045281; 8 pages.

*Primary Examiner* — Mark A Laurenzi
*Assistant Examiner* — Wesley G Harris
(74) *Attorney, Agent, or Firm* — BrooksGroup

(57) ABSTRACT

High pressure loop exhaust gas circulation is achieved in an exhaust system (10) of an engine (12) by providing an adjustable valve (100) in an exhaust passage (18) of the engine (12). The valve (100) is configured to control fluid flow through the passage (18) and generate pressure to drive the high pressure exhaust gas recirculation. The valve (100) includes a valve inner surface (110) that has a curvilinear profile when viewed in longitudinal cross section. An actuator (140) is connected to the valve (100), and is configured (Continued)

to move the valve (100) relative to the exhaust passage (18) so as to control exhaust gas pressure within the exhaust passage (18). In some embodiments, a pilot tube (280) is used in combination with the valve (100) to generate high pressure exhaust gas recirculation at the engine (12) intake.

21 Claims, 6 Drawing Sheets

(51) Int. Cl.
| | |
|---|---|
| F16K 15/02 | (2006.01) |
| F16K 1/22 | (2006.01) |
| F16K 3/00 | (2006.01) |
| F16K 1/20 | (2006.01) |
| F02D 9/10 | (2006.01) |
| F02B 37/18 | (2006.01) |
| F16K 1/12 | (2006.01) |
| F16K 11/085 | (2006.01) |
| F02B 39/00 | (2006.01) |
| F02M 26/05 | (2016.01) |
| F02M 26/10 | (2016.01) |
| F02B 29/04 | (2006.01) |
| F02B 37/02 | (2006.01) |
| F02B 37/22 | (2006.01) |
| F02D 9/04 | (2006.01) |
| F02D 9/14 | (2006.01) |
| F02M 26/43 | (2016.01) |

(52) U.S. Cl.
CPC .............. *F02B 39/00* (2013.01); *F02D 9/101* (2013.01); *F02D 9/1015* (2013.01); *F02M 26/05* (2016.02); *F02M 26/10* (2016.02); *F16K 1/12* (2013.01); *F16K 1/2014* (2013.01); *F16K 1/222* (2013.01); *F16K 3/00* (2013.01); *F16K 11/085* (2013.01); *F16K 15/026* (2013.01); *F02B 29/0406* (2013.01); *F02B 37/025* (2013.01); *F02B 37/22* (2013.01); *F02D 9/04* (2013.01); *F02D 9/14* (2013.01); *F02M 26/43* (2016.02)

(58) Field of Classification Search
CPC ....... F02D 9/101; F02D 9/1015; F02M 26/70; F02M 26/05; F16K 1/12; F16K 1/2014; F16K 11/085; F16K 15/026; F16K 1/222; F16K 3/00
See application file for complete search history.

(56) References Cited

U.S. PATENT DOCUMENTS

| | | | |
|---|---|---|---|
| 5,435,280 A * | 7/1995 | Hackett | ................... F01L 3/08 123/188.9 |
| 5,740,785 A | 4/1998 | Dickey et al. | |
| 5,911,212 A * | 6/1999 | Benson | ............... F02B 29/0418 123/563 |
| 6,216,459 B1 | 4/2001 | Dauudel et al. | |
| 6,301,889 B1 | 10/2001 | Gladden et al. | |
| 6,672,061 B2 | 1/2004 | Schmid et al. | |
| 7,051,527 B2 | 5/2006 | Schmid et al. | |
| 7,513,114 B2 | 4/2009 | Sumser et al. | |
| 7,562,529 B2 | 7/2009 | Kuspert et al. | |
| 8,186,335 B2 | 5/2012 | Ishibashi et al. | |
| 8,297,053 B2 | 10/2012 | Gladden et al. | |
| 8,387,385 B2 | 3/2013 | Gray, Jr. et al. | |
| 8,499,557 B2 | 8/2013 | Grabowska | |
| 8,522,547 B2 | 9/2013 | Sumser et al. | |
| 2006/0042246 A1* | 3/2006 | Gray, Jr. | ................. F01D 17/14 60/612 |
| 2013/0193363 A1* | 8/2013 | van den Eijkel | ....... F16K 27/00 251/366 |
| 2014/0174077 A1* | 6/2014 | Palaniyappan | ....... F16K 1/2014 60/602 |
| 2014/0238364 A1* | 8/2014 | Beyer | ............. F02M 35/10222 123/568.21 |

* cited by examiner

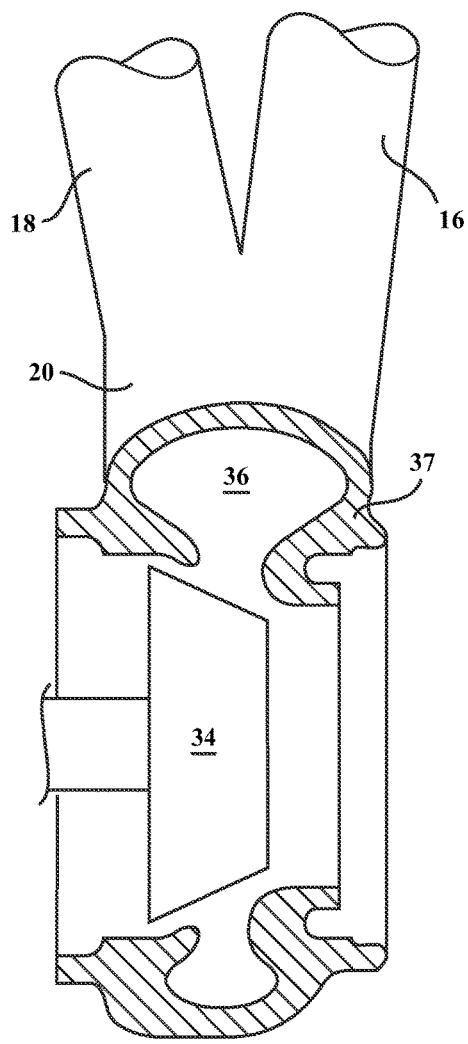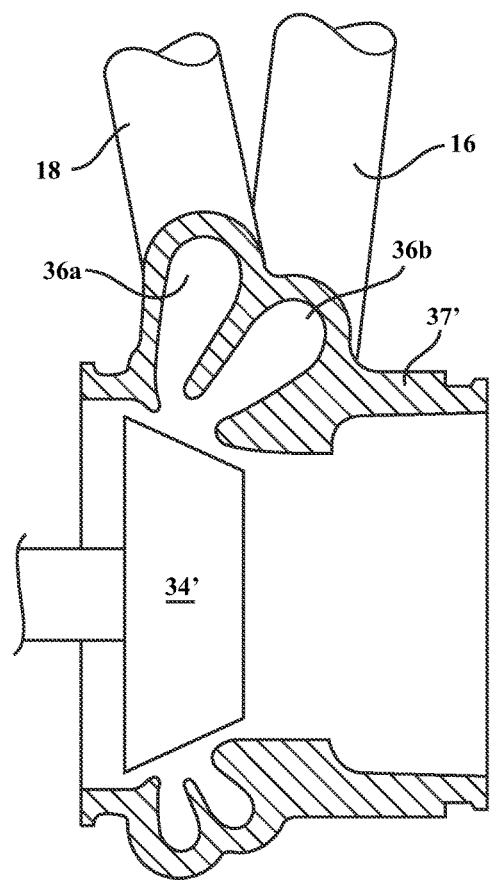
FIG. 12
FIG. 13

ADJUSTABLE, LOW LOSS VALVE FOR PROVIDING HIGH PRESSURE LOOP EXHAUST GAS RECIRCULATION

CROSS-REFERENCE TO RELATED APPLICATION

This application claims the benefit of PCT Application Serial No. US2015/045281 filed Aug. 14, 2015 and U.S. Provisional Application Ser. No. 62/041,844 filed Aug. 26, 2014.

BACKGROUND

Turbochargers are provided on an engine to deliver air to the engine intake at a greater density than would be possible in a normal aspirated configuration. This allows more fuel to be combusted, thus boosting the engine's horsepower without significantly increasing engine weight.

Generally, turbochargers use the exhaust flow from the engine exhaust manifold, which enters the turbine stage of the turbocharger at a turbine housing inlet, to thereby drive a turbine wheel, which is located in the turbine housing. The turbine wheel is affixed to one end of a shaft that is rotatably supported within a bearing housing. The shaft drives a compressor impeller mounted on the other end of the shaft. As such, the turbine wheel provides rotational power to drive the compressor impeller and thereby drive the compressor of the turbocharger. This compressed air is then provided to the engine intake as described above.

There are circumstances in which it is desirable to take some of the high pressure exhaust gas flow from the engine before it reaches the turbine wheel, and redirect it to the engine air intake along with pressurized air from the compressor section of the turbocharger. For example, Exhaust Gas Recirculation (EGR) can reduce NOx emissions (e.g., NO (nitric oxide) and $NO_2$ (nitrogen dioxide)) of the engine.

In order to direct some exhaust gas flow to the engine intake, some known exhaust system configurations include valves that block exhaust flow from the engine in order to drive up pressure and direct flow to the engine air intake. However some of these configurations lead to pressure increases across all engine cylinders that are sufficient so that the engine has to work harder to push the exhaust into the exhaust system. This in turn leads to engine pumping losses and thus engine inefficiencies.

SUMMARY

In some aspects, an engine exhaust system for an engine is coupled to a turbocharger. The engine exhaust system includes an exhaust passage that connects the turbocharger (30) to an exhaust of the engine, and a valve disposed in the exhaust passage, the valve configured to generate pressure to drive high pressure exhaust gas recirculation to the engine. The valve includes a first end that faces a flow of exhaust gas within the exhaust passage; a second end opposed to the first end; a valve longitudinal axis that extends through both the first end and the second end; a valve outer surface that is configured to conform to the shape and dimensions of the exhaust passage; and a valve inner surface that has a curvilinear profile when viewed in longitudinal cross section. The engine exhaust system also includes an actuator connected to the valve, the actuator configured to move the valve relative to the exhaust passage so as to control exhaust gas pressure within the exhaust passage.

The engine exhaust system may include one or more of the following features: The valve inner surface defines a converging portion that adjoins the first end and a diverging portion disposed between the converging portion and the second end. The valve inner surface defines a first concave portion adjoining the first end, a second concave portion adjoining the second end, and a convex portion disposed between the first concave portion and the second concave portion. The valve inner surface defines a smoothly curving surface. The valve inner surface is configured so that the intersection of the valve with a first plane that is transverse to the valve longitudinal axis defines a first line at the valve inner surface, the first line is parallel to an axis that is transverse to the valve longitudinal axis, for any location of the first plane between the first end and the second end, and a second line that is defined by the intersection of a second transverse plane with the valve is parallel to the first line regardless of the axial location of the second transverse plane. The valve is disposed in the exhaust passage such that the valve longitudinal axis is generally parallel to a direction of flow of exhaust gas within the exhaust passage. The valve is disposed in the exhaust passage at a location upstream relative to the turbocharger.

The engine exhaust system may include one or more of the following additional features: A pilot tube is disposed in the exhaust passage, and the pilot tube is connected to an air intake of the engine via a duct, and is configured to increase pressure of gas introduced into the engine. A pilot tube is disposed in the exhaust passage at a location corresponding to the valve, and the pilot tube is connected to an air intake of the engine via a duct, and is configured to increase pressure of gas introduced into the engine. A pilot tube is disposed in the exhaust passage so as to be aligned with a flow stream of exhaust gas within the exhaust passage, wherein the pilot tube includes a leading edge facing the flow stream and configured to reduce the velocity of the flow stream, a pilot tube internal passageway that opens in the leading edge at a location in which the flow stream has a maximum velocity, wherein the pilot tube internal passageway is connected to an air intake of the engine via duct, and when exhaust gas flows within the exhaust passage past the pilot tube, pressure within the pilot tube internal passageway is increased, whereby pressure of gas introduced into the air intake is increased. The pilot tube is located within the exhaust passage at an axial location corresponding to the axial location of the valve. The actuator is connected to the valve via a rod, the actuator is disposed externally of the exhaust passage, and the rod passes through an opening in a wall of the exhaust passage, a seal is disposed in the opening that provides a seal between the rod and the wall of the exhaust passage, a pressure drain is provided in the wall of the exhaust passage, and the pressure drain opens adjacent the seal. The seal comprises a first piston ring and a second piston ring that are disposed in the opening and provide a labyrinth seal between the rod and the wall of the exhaust passage, and the pressure drain opens between the first piston ring and the second piston ring. The pressure drain includes a first end that opens between the first piston ring and the second piston ring, and a second end that opens in the exhaust passage at a location disposed between the turbocharger and an exhaust after-treatment device. The engine exhaust system includes at least one of the engine and the turbocharger. The valve inner surface is spaced apart from a facing surface of the exhaust passage, regardless of valve position.

In some aspects, a valve is configured to control the flow of fluid in a passageway. The valve includes a first end that faces a flow of fluid within the passageway; a second end opposed to the first end; a valve longitudinal axis that extends through both the first end and the second end; a valve outer surface that is configured to conform to the shape and dimensions of the passageway; and a valve inner surface that has a curvilinear profile when viewed in longitudinal cross section.

The valve may include one or more of the following features: The valve inner surface defines a converging portion that adjoins the first end and a diverging portion disposed between the converging portion and the second end. The valve inner surface defines a first concave portion adjoining the first end, a second concave portion adjoining the second end, and a convex portion disposed between the first concave portion and the second concave portion. The valve inner surface defines a smoothly curving surface. The valve inner surface is configured so that the intersection of the valve with a first plane that is transverse to the valve longitudinal axis defines a first line at the valve inner surface, the first line is parallel to an axis that is transverse to the valve longitudinal axis, for any location of the first plane between the first end and the second end, and a second line that is defined by the intersection of a second transverse plane with the valve is parallel to the first line regardless of the axial location of the second transverse plane.

In some aspects, an engine exhaust system includes a valve used to drive high pressure loop EGR, in which the valve is adjustable. For example, by varying the valve axial position within an exhaust passage, the area of the valve opening is varied, whereby the pressure upstream of the valve can be controlled and adjusted. The valve has a shape that is smoothly curved to provide protruding central portion that converges toward the opposed exhaust passage wall. In addition, the valve includes diverging portions that smoothly lead into, and trail from, the converging central portion. The converging and diverging portions of the valve surface provide gradual changes in the passage shape. As a result, the losses due to pressure drop are minimized at both the leading end and trailing end of the valve. Another benefit of the valve shape is that the valve can be installed backwards and still operate properly, can be used in a passageway in which fluid can flow in both directions, and/or can be easily adapted to alternative passageway and space configurations presented by a manufacturer.

The valve is configured so that in some positions, the valve can be completely removed from the exhaust gas flow stream so that the exhaust passageway is unobstructed, and in other positions the exhaust gas passageway is partially or fully obstructed.

In some embodiments, pilot tubes are used with the valve to increase pressure and extract exhaust gases. The pilot tube is directed into the flow, and the velocity of the flow generates pressure within the pilot tube that is used in the high pressure loop EGR. Using the pilot tube in combination with the valve permits sufficient pressure to be directed to the engine intake, while reducing the amount of blockage of the passageway by the valve, reducing pumping losses associated with passageway blockage.

BRIEF DESCRIPTION OF THE DRAWINGS

Embodiments are illustrated by way of example and not limitation in the accompanying drawings in which like reference numbers indicate similar parts.

FIG. 12 is a cross-sectional view of a single-volute turbine housing connected to a merged exhaust passage.

FIG. 13 is a cross-sectional view of a twin-volute turbine housing, each volute connected to a dedicated exhaust passage.

DETAILED DESCRIPTION

Figure 1:
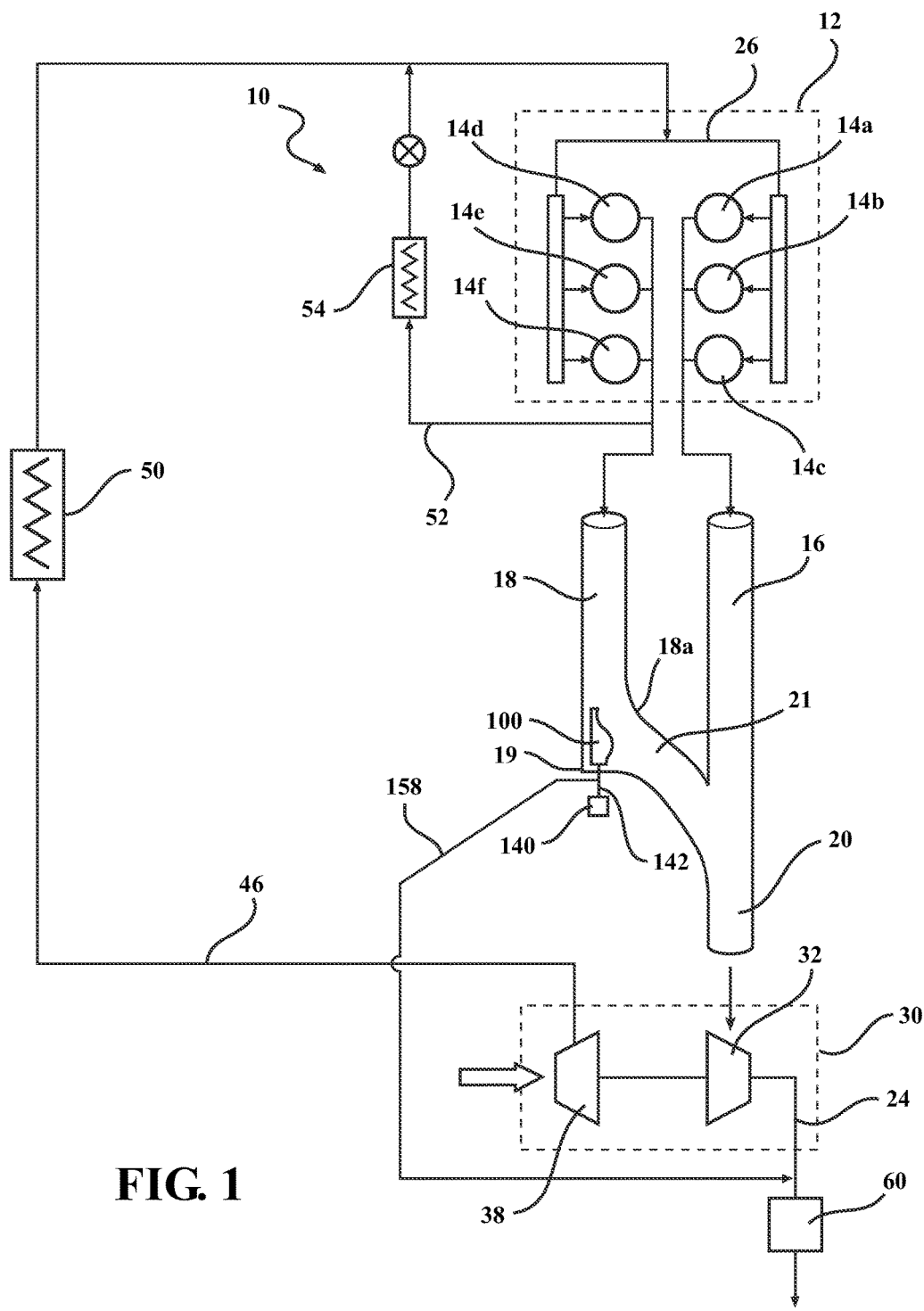
FIG. 1 is a schematic view of a high pressure loop EGR system.
Figure 2:
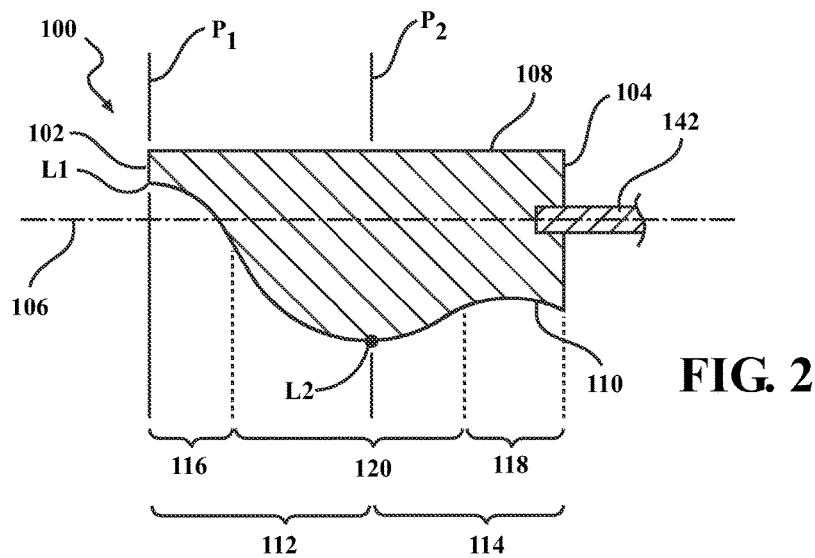
FIG. 2 is a longitudinal cross-sectional view of a valve of the system of FIG. 1.
Figure 3:
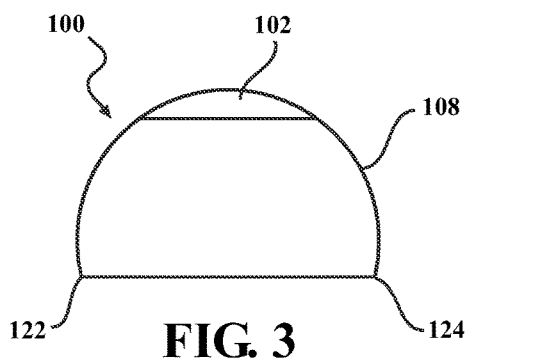
FIG. 3 is a leading end view of the valve of FIG. 2.
Figure 4:
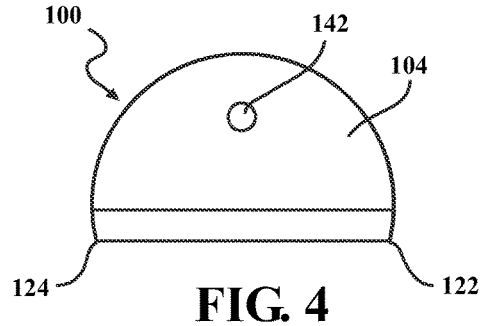
FIG. 4 is a trailing end view of the valve of FIG. 2.
Figure 5:
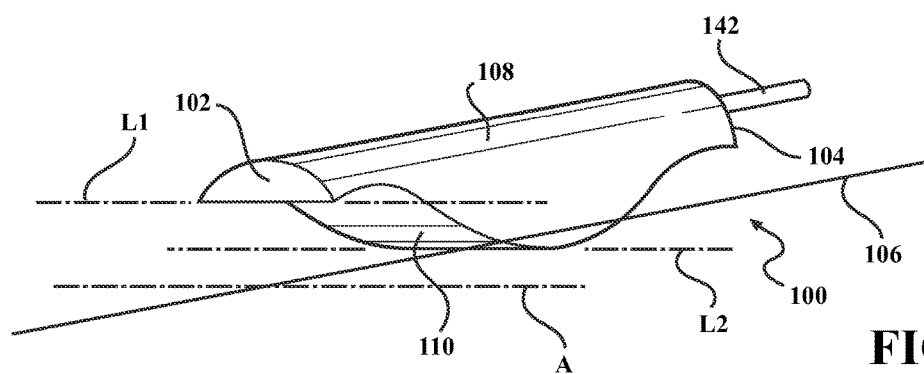
FIG. 5 is a front perspective view of the valve of FIG. 2.

Referring to FIG. 1, a high pressure loop exhaust gas recirculation system 10 for a turbocharged internal combustion engine 12 includes a valve 100 that adjustably controls the pressure of exhaust gas in the exhaust passageway downstream of the engine, whereby sufficient pressure can be obtained in the system 10 to drive the high pressure loop EGR. The engine 12 is arranged so that one or more of the engine cylinders, for example cylinders 14*a*, 14*b* and 14*c*, are connected to a first exhaust passage 16, while the remaining engine cylinders, for example cylinders 14*d*, 14*e* and 14*f* are connected to a second exhaust passage 18, where the second exhaust passage 18 is separate from the first exhaust passage 16. Downstream of the engine 12, the first and second exhaust passages 16 and 18 merge into a single inlet passage 20 that supplies high temperature, high pressure exhaust gas to an exhaust gas turbine 32 of a turbocharger 30. After being expanded within the turbine 32, the reduced-pressure exhaust gas is directed via an exhaust gas outlet passage 24 to one or more after-treatment devices 60 such as catalytic converters, particulate traps, and NO$_x$ traps prior to being released to the atmosphere.

On the air delivery side of the engine 12, charged air is generated within the compressor section 38 of the turbocharger 30, and supplied to the engine cylinders 14*a-f* via an air delivery line 46 connected to an air intake manifold 26 of the engine 12. An intercooler device 50 is disposed in the air delivery line 46 to cool the charged air prior to delivery to the cylinders 14*a-f*. Exhaust gas recirculation is accomplished via an EGR passage 52 that connects the second exhaust passage 18 to the air delivery line 46. An EGR cooler 54 is provided in the EGR passage 52 to cool the recirculated portion of the exhaust gas prior to delivery to the air delivery line 46. In the system 10, the valve 100 is disposed in the second exhaust passage 18 to enable generation of sufficient pressures in the second exhaust passage 18 and the EGR passage 52 to achieve high pressure EGR.

The valve 100 is disposed in the second exhaust passage 18 and is used to increase the discharge pressure from the cylinders 14*d*, 14*e*, and 14*f* in order to supply high pressure exhaust gas to the air intake manifold 26. In this regard, the valve 100 is configured to control the amount of pressure in the second exhaust passage 18 upstream of the valve 100, the EGR passage 52 and in the corresponding engine cylinders 14d, 14e, 14f. Since only a subset of the engine cylinders, 14d, 14e and 14f are connected to the second exhaust passage 18, only a portion of the engine 12 experiences pumping losses associated with the EGR.

Referring to FIGS. 2-5, the valve 100 is generally in the form of a half-cylinder, e.g., a cylinder that has been generally halved lengthwise. The valve 100 includes a first, or leading, end 102 that faces a flow of exhaust gas within the second exhaust passage 18, and a second, or trailing, end 104 that is opposed to the first end 102. The valve 100 includes a valve longitudinal axis 106 that extends through both the first end 102 and the second end 104, and the first and second ends 102, 104 each define a plane transverse to the valve longitudinal axis 106.

The valve 100 includes a valve outer surface 108 that is configured to conform to the shape and dimensions of the second exhaust passage 18. In this embodiment, the valve outer surface 108 has the shape of a cylinder. The cylindrical shape of the valve outer surface 108 is selected to correspond to the cylindrical shape of the second exhaust passage 18, but the valve outer surface 108 and the second exhaust passage 18 are not limited to this shape. In addition, the valve 100 includes a valve inner surface 110 that has a curvilinear profile when viewed in longitudinal cross section (FIG. 2), as discussed further below. The valve outer surface 108 and the valve inner surface 110 each have longitudinally-extending side edges that co-terminate to form longitudinally-extending valve side edges 122, 124.

The valve inner surface 110 has a shape that is configured to avoid sharp changes in pressure within the second exhaust passage 18, and therefore to also reduce losses as exhaust flow passes over the valve 100. In particular, when viewed in longitudinal cross section, the valve inner surface 110 includes a shallow, first concave portion 116 that adjoins the valve first end 102, and a shallow, second concave portion 118 that adjoins the valve second end 104. In addition, when viewed in longitudinal cross section, the valve inner surface 110 includes a convex portion 120 that is disposed between the first and second concave portions 116, 118. The transitions between the concave portions 116, 118 and the convex portion 120 are smooth, whereby the valve inner surface 110 defines a smoothly curving surface.

The convex portion 120 has an axial length that is greater than the axial length of the first and second concave portions 116, 118, and a maximum radial dimension that is greater than the maximum radial dimension of the first and second concave portions 116, 118. In other words, the convex portion 120 is pronounced when compared to the first and second concave portions 116, 118.

In addition, the valve inner surface 110 is configured so that the intersection of the valve 100 with a plane P1 that is transverse to the valve longitudinal axis 106 defines a line L1 at the valve inner surface 110. The line L1 is parallel to an axis A that is transverse to the valve longitudinal axis 106, for any location of the plane P1 between the first end 102 and the second end 104. In addition, a line L2 that is defined by the intersection of a second transverse plane P2 with the valve 100 is parallel to the line L1 that corresponds to a transverse plane P1, regardless of the axial location of the plane P2.

The concave and convex portion 116, 118, 120 of the valve inner surface 110 provide a valve 100 that includes a converging portion 112 and a diverging portion 114. The converging portion 112 begins at the first (e.g., leading) end 102, and corresponds to the first concave portion 116 and a leading face of the convex portion 120. The term "converging" refers to the arrangement in which the valve inner surface 110 in this leading-end region converges smoothly and gradually toward the facing surface 18a of the second exhaust passage 18. The diverging portion 114 corresponds to the trailing face of the convex portion 120 and the second concave portion 118, and terminates at the second (e.g., trailing) end 104. Likewise, the term "diverging" refers to arrangement in which the valve inner surface 110 in this trailing-end region diverges smoothly and gradually away from the facing surface 18a of the second exhaust passageway.

The valve 100 is disposed within the second exhaust passage 18 so that the valve outer surface 108 is positioned adjacent a wall 27 of the exhaust passage with minimal clearance, and the valve inner surface faces, and is spaced apart from, a facing surface 18a of the second exhaust passage 18. In addition, the valve 100 is oriented so that the first end 102 faces a flow of exhaust gas within the second exhaust passage 18, and the longitudinal axis is generally parallel to the direction of exhaust gas flow.

Figure 6:
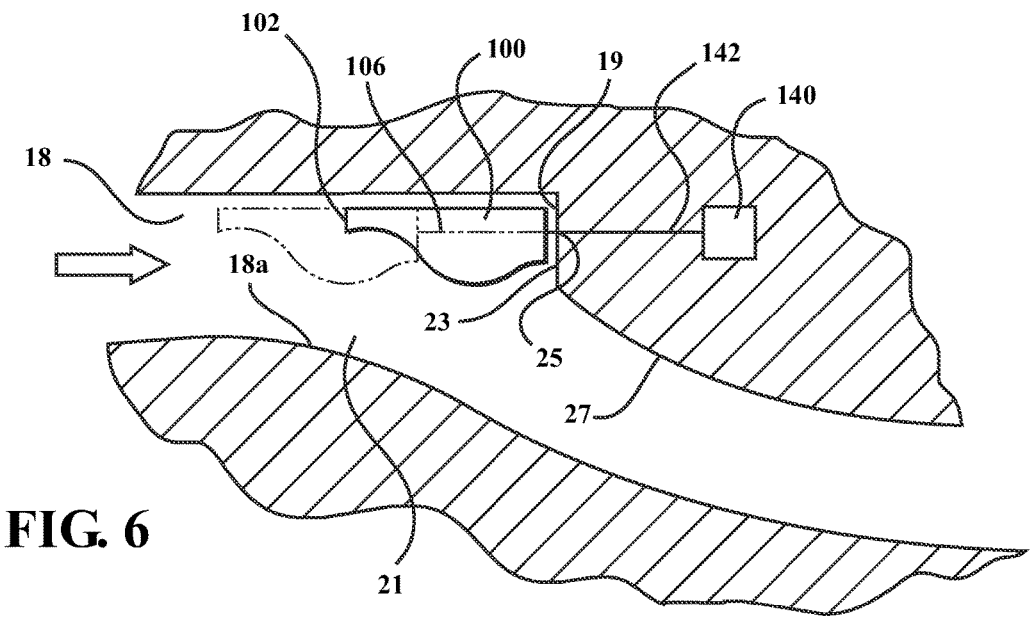
FIG. 6 is an illustration of a portion of the exhaust passage with the valve disposed therein.

Referring to FIGS. 1 and 6, the amount of pressure generated in the EGR passage and the cylinders 14d, 14e, 14f connected to the second exhaust passage 18 is determined by varying the axial position of the valve 100 relative to an inner surface of the second exhaust passage 18. That is, pressure is varied by varying the amount of blockage of the second exhaust passage 18 that is provided by the valve 100. The axial position of the valve 100 within the second exhaust passage 18 is adjustable, and is controlled by the actuator 140. The valve 100 is connected to an actuator 140 via a rod 142. The rod 142 extends parallel to the valve longitudinal axis 106 and is fixed to the valve second end 104. The actuator 140 is configured to translate the valve 100 in a direction parallel to the direction of gas flow between a first position in which the valve 100 is fully retracted from the second exhaust passage 18 and exhaust flow past the valve 100 is not obstructed, and a second position in which the valve 100 resides within the flow path and partially obstructs the flow path.

The actuator 140 is disposed outside the second exhaust passage, and thus the rod 142 extends through an opening 25 in the wall 27 of the second exhaust passage 18. In order to both permit translation of the valve 100 in a direction parallel to the direction of gas flow within the second exhaust passage 18, and to accommodate the presence of the externally positioned actuator 140, the second exhaust passage 18 includes a curved portion 21 that is configured to receive the valve 100.

In addition, in order to permit the valve 100 to be fully retracted from the gas flow within the second exhaust passage 18, the second exhaust passage 18 is formed having a recess 19 that is shaped and dimensioned to receive the valve 100 therein. In the illustrated embodiment, the recess 19 is located in the curved portion 21. The recess 19 includes a generally planar wall portion 23 that is oriented perpendicular to the direction of motion of the valve 100. The opening 25 through which the rod 142 extends is formed in the planar wall portion 23.

In use, the valve 100 is disposed within curved portion 21 of the second exhaust passage 18 with the longitudinal axis 106 extending generally parallel to the direction of gas flow within the passage, and with the first end 102 facing the gas flow. When the valve 100 is in the first position, the valve 100 is retracted into the recess 19 to an extent that gas flow within the second exhaust passage 18 is not obstructed by the valve 100. For example, the valve inner surface 110 is generally aligned with, provides a portion of, the exhaust passage sidewall, and the converging portion 112 serves to direct fluid through the curved portion 21 of the second exhaust passage 18. When the valve 100 is in the second position, the valve 100 has been advanced out of the recess and into the flow path such that it partially obstructs the flow path. When used to generate pressure for use in EGR, the valve 100 is not required to completely obstruct the second exhaust passage 18 (e.g., prevent any flow of gas through the second exhaust passage 18). Thus, in this embodiment, the valve inner surface 110 is spaced apart from the facing surface 18a of the second exhaust passage 18, regardless of valve position.

Figure 7:
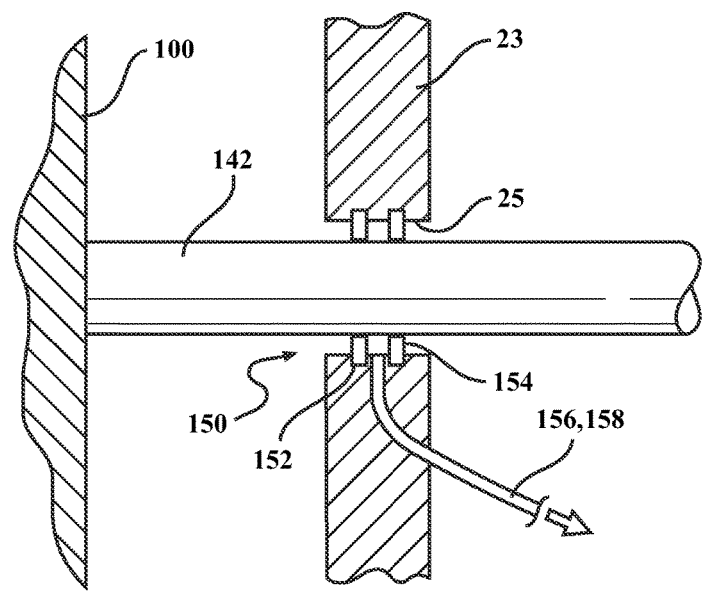
FIG. 7 is an enlarged view of a seal provided in the exhaust passage wall.

Referring to FIGS. 1 and 7, in order to prevent exhaust gas leakage through the opening 25 in the wall portion 23, a seal 150 is disposed in the wall portion 23. For example, the seal 150 may be a labyrinth seal in which a first piston ring 152 and a second piston ring 154 are disposed in the opening 25 between the rod 142 and the wall portion 23. In addition, a pressure drain 156 is provided in the wall portion 23. The pressure drain 156 includes a drain line 158 that passes through the wall portion 23 and opens at a location between the first and second piston rings 152, 154. The drain line 158 configured to direct pressurized fluid from the space between the piston rings 152, 154, to the exhaust gas outlet passage 24 at a location between the turbocharger 30 and the exhaust after-treatment device 60.

Figure 8:
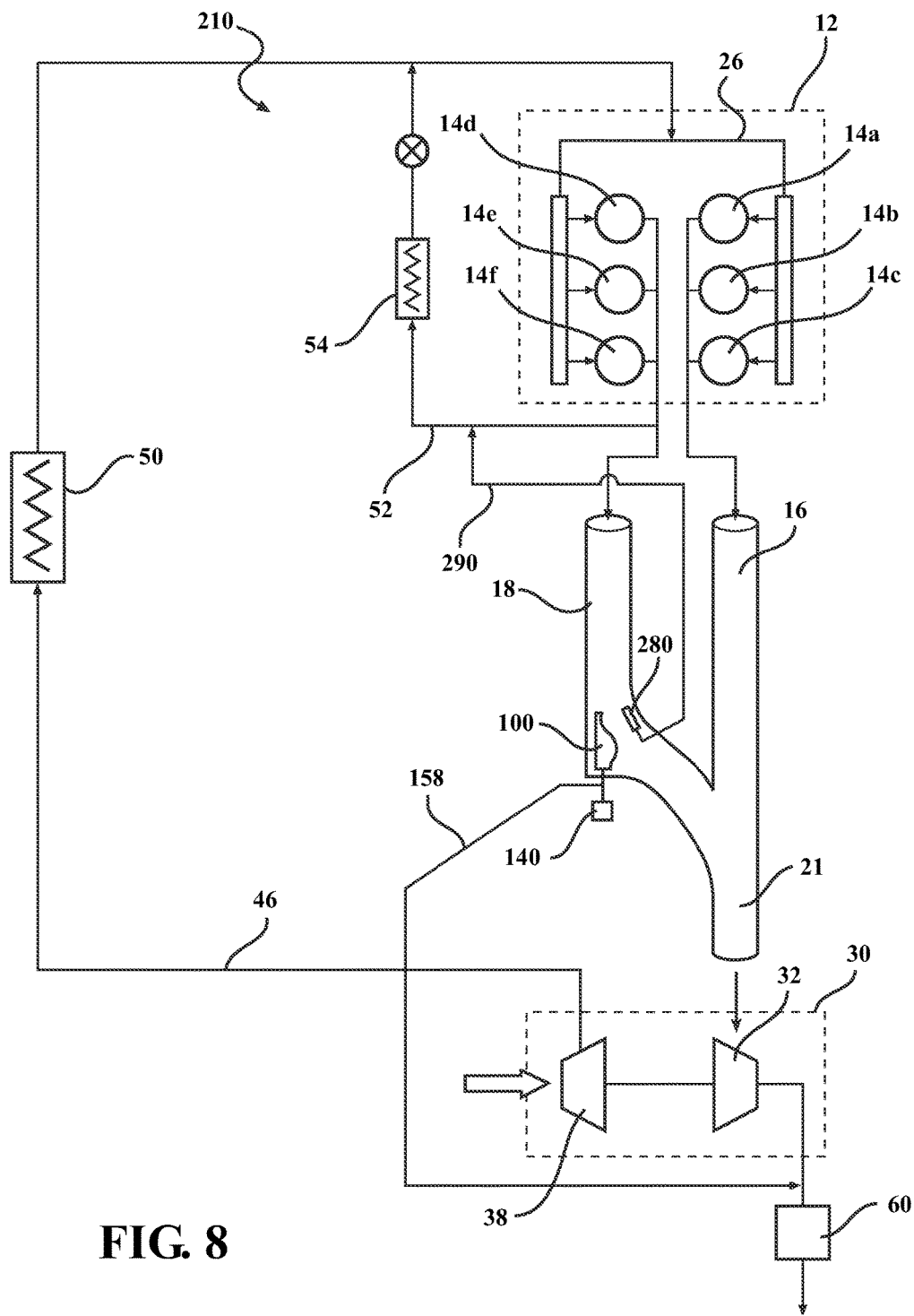
FIG. 8 is a schematic view of an alternative high pressure loop EGR system.
Figure 9:
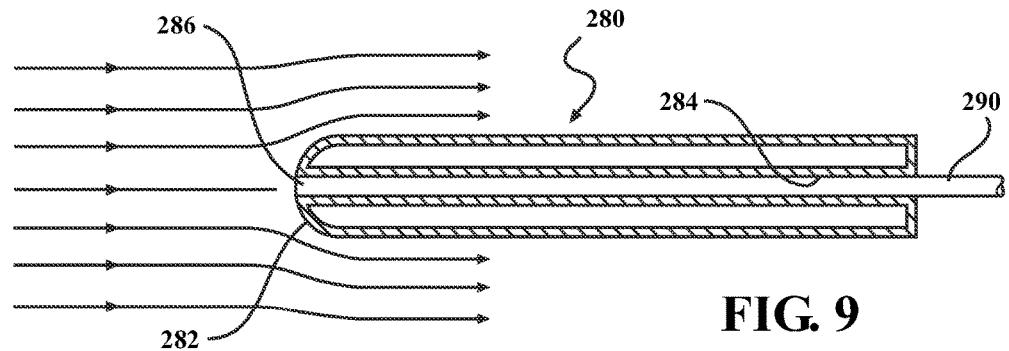
FIG. 9 is a side sectional view of a pilot tube of the system of FIG. 8.

Referring to FIGS. 8 and 9, an alternative high pressure loop EGR system 210 includes the valve 100 disposed in the second exhaust passage 18 as described above, and further includes a pilot tube 280 disposed in the second exhaust passage 18 in the vicinity of the valve 100. In the system 210, the pilot tube 280 is not used as a flow velocity sensor, but instead is used to extract exhaust gas from the exhaust gas flow stream at a location upstream of the valve 100 (e.g., at a location between the engine 12 and the valve 100). The pilot tube 280 is connected via a duct 290 to the air intake manifold 26 of the engine 12, whereby the pressure of the air introduced into the engine 12 is increased.

The pilot tube 280 is an elongated tube including a rounded leading tube end 282, and an internal passageway 284 that opens at the leading tube end 282. The pilot tube 280 is oriented within the second exhaust passage 18 in alignment with the direction of exhaust gas flow, and with the leading tube end 282 facing the flow stream. In part, due to the round shape of the leading tube end 282, the velocity of the flow stream is reduced as it flows past the pilot tube 280. Moreover, the internal passageway 284 opens at the leading tube end 282 at a location in which the flow stream has a velocity of zero. As a result, a high pressure is generated in the pilot tube internal passageway 284, which in turn is connected to the engine air intake manifold 26 via the duct 290. As a result, when exhaust gas flows within the second exhaust passage 18 past the pilot tube 280, pressure within the pilot tube internal passageway 284 is increased, whereby pressure of the air introduced into the air intake manifold 26 is increased.

In the illustrated embodiment, the pilot tube 280 is disposed within the second exhaust passage 18 at a location corresponding to the location of the valve 100 (e.g. at substantially the same distance from the engine within the second exhaust passage 18). In other embodiments, the pilot tube 280 is disposed within the second exhaust passage 18 at a location between the engine 12 and the valve 100. In still other embodiments, the pilot tube 280 is disposed within the second exhaust passage 18 at a location between the valve 100 and the turbocharger 30. In still other embodiments, more than one pilot tube 280 is disposed within the second exhaust passage 18.

The pilot tube 280 is directed into the flow, and the velocity of the flow generates pressure within the pilot tube 280 that is used in the high pressure loop EGR system 10. Using the pilot tube 280 in combination with the valve 100 produces increased pressure at the pilot tube 280 relative to use of the pilot tube 280 alone, since when the valve 100 is operated to partially obstruct the second exhaust passage 18, pressure at the pilot tube 280, which is located upstream of the valve 100, is increased. Moreover, using the pilot tube 280 in combination with the valve 100 permits sufficient pressure to be directed to the engine air intake manifold 26, while reducing the amount of blockage of the second exhaust passage 18 by the valve 100, reducing pumping losses associated with passage blockage.

Figure 10:
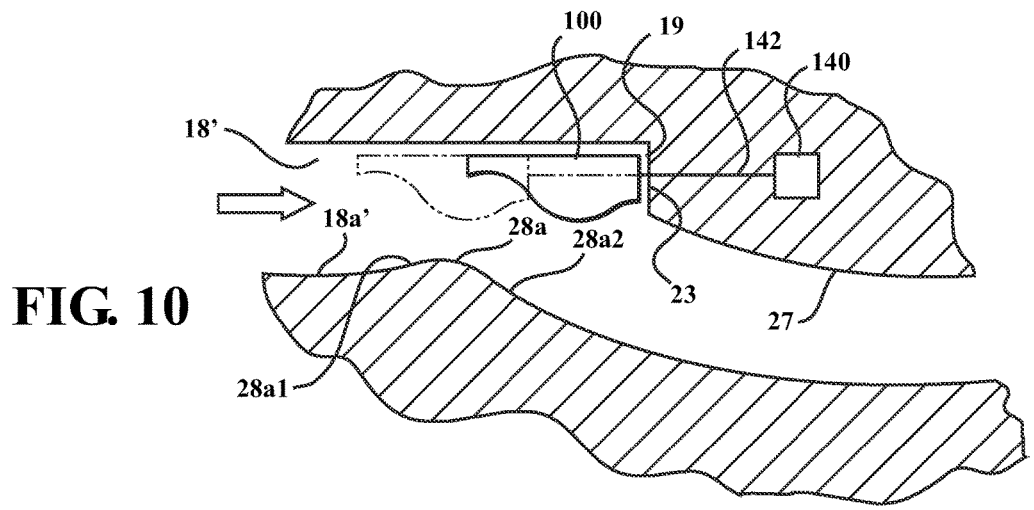
FIG. 10 is an illustration of a portion of an exhaust passage having a modified shape with the valve disposed therein.

Referring to FIG. 10, in some embodiments, the shape of facing surface 18a of the second exhaust passage 18 can be modified to include a smoothly curving portion 28a in the vicinity of the valve 100. In particular, the modified facing surface 18a' of the second exhaust passage 18' may be formed having a shape that is a smoothly converging at a leading edge 28a1 thereof, and smoothly converging at a trailing edge 28a2 thereof. The smoothly curving portion 28a is shaped and located to complement the shape of the valve inner surface 110. For example, in some embodiments, the smoothly curving portion 28a is a mirror image of the valve inner surface 110. In these or other embodiments, the smoothly curving portion 28a of the passage wall 27 is positioned within the second exhaust passage 18 at a location corresponding to that of the valve 100 when the valve 100 is in the second position. By controlling the complementary shapes and locations of the valve inner surface 110 and the second exhaust passage smoothly curving portion 28a, flow through the second exhaust passage 18' and pressure on the engine cylinders 14d-f can be further tuned.

Figure 11:
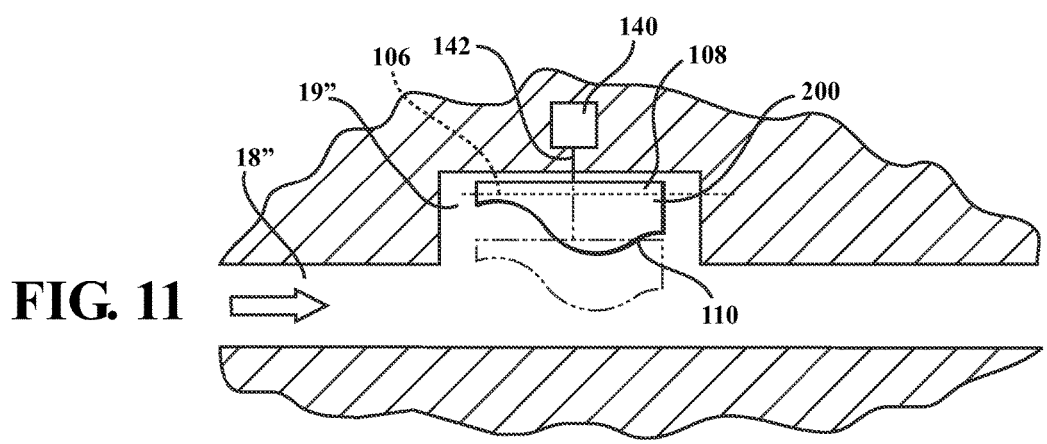
FIG. 11 is an illustration of a portion of the exhaust passage with a modified valve disposed therein.

Referring to FIG. 11, although the valve 100 is described herein as being connected to the actuator 140 via a rod 142 that extends parallel to the valve longitudinal axis 106 such that the valve moves linearly in parallel to the valve longitudinal axis 106, and is arranged within the second exhaust passage 18 in such a way as to move generally in parallel to the direction defined by the flow of exhaust gas, the valve 100 is not limited to this configuration. For example, an alternative valve 200 is configured to move in a direction perpendicular to the direction of gas flow within the exhaust passage. The valve 200 is substantially similar in shape and function to the valve 100, and thus common reference numbers are used to refer to common elements. The valve 200 is connected to the actuator 140 via a rod 142 that extends perpendicular to the valve longitudinal axis 106 such that the valve 200 moves linearly in a direction perpendicular to the valve longitudinal axis 106. In addition, the valve 200 is arranged within the second exhaust passage 18" in such a way as to move generally perpendicular to the direction defined by the flow of exhaust gas. Like the previous embodiment, the valve 200 is movable between a first position in which the valve 200 is fully retracted from the second exhaust passage 18" and exhaust flow past the valve 200 is not obstructed, and a second position in which the valve 200 resides within the flow path and partially obstructs the flow path. Because the movement of the valve 200 is perpendicular to the direction of fluid flow through the second exhaust passage 18", the actuator 140 can be positioned along a side cut-out portion 19" of the second exhaust passage 18", and the second exhaust passage 18" can have a linear configuration in the vicinity of the valve 200.

Referring to FIGS. 12 and 13, in the illustrated high pressure loop exhaust gas recirculation system 10, the first and second exhaust passages 16 and 18 merge into a single inlet passage 20 that supplies high temperature, high pressure exhaust gas to an exhaust gas turbine 32 of a turbocharger 30 (FIG. 12). In this configuration, the single inlet passage 20 is connected to the volute 36 of a single-volute turbine housing 37, where it is directed toward the turbine wheel 34. However, the exhaust system is not limited to this configuration. For example, in some embodiments, the turbine housing 37' includes twin volutes 36a, 36b, the first exhaust passage 16 supplies high temperature, high pressure exhaust gas to one of the volutes (e.g., volute 36a), and the second exhaust passage 18 supplies high temperature, high pressure exhaust gas to the other one of the volutes (e.g., volute 36b) (FIG. 13). Although the volutes 36a, 36b of the turbine housing 37' are illustrated as symmetric, they are not limited to this configuration, and can instead be asymmetric. Moreover, when used in a twin flow volute, the valve 100, 200 can be incorporated into the turbine housing.

Although the high pressure loop exhaust gas recirculation system 10 illustrated herein is configured so that three of the engine cylinders, for example, cylinders 14a, 14b and 14c are connected to the first exhaust passage 16, and the remaining engine cylinders, for example, cylinders 14d, 14e and 14f are connected to a second exhaust passage 18, the system 10 is not limited to this configuration. For example, a greater or fewer numbers of the cylinders can be connected to the first exhaust passage 16, with the remaining cylinders being connected to the second exhaust passage 18.

Although the valve 100, 200 is described herein as configured for use in a high pressure loop EGR system, the valve 100, 200 is not limited to this application. For example, in some embodiments, the valve 100, 200 can be employed to provide engine braking via backpressure on the engine cylinders 14d-f.

Aspects described herein can be embodied in other forms and combinations without departing from the spirit or essential attributes thereof. It is understood that embodiments are not limited to the specific details described herein, which are given by way of example only, and that various modifications and alterations are possible within the scope of the following claims.

What is claimed is:

1. An engine exhaust system for an engine that is coupled to a turbocharger, the engine exhaust system comprising
an exhaust passage that connects the turbocharger to an exhaust of the engine;
a valve disposed in the exhaust passage, the valve configured to generate pressure to drive high pressure exhaust gas recirculation to the engine, the valve including
a first end that faces a flow of exhaust gas within the exhaust passage;
a second end opposed to the first end;
a valve longitudinal axis that extends through both the first end and the second end;
a valve outer surface that is configured to conform to the shape and dimensions of the exhaust passage; and
a valve inner surface that has a curvilinear profile when viewed in longitudinal cross section; and
an actuator connected to the valve, the actuator configured to move the valve relative to the exhaust passage so as to control exhaust gas pressure within the exhaust passage, wherein the actuator is disposed such that the actuator movement is generally parallel to a direction of flow of exhaust gas contacting the valve.

2. The engine exhaust system of claim 1 wherein the valve inner surface defines a converging portion that adjoins the first end and a diverging portion disposed between the converging portion and the second end.

3. The engine exhaust system of claim 1 wherein the valve inner surface defines a first concave portion adjoining the first end, a second concave portion adjoining the second end, and a convex portion disposed between the first concave portion and the second concave portion.

4. The engine exhaust system of claim 3, wherein the valve inner surface defines a smoothly curving surface.

5. The engine exhaust system of claim 1, wherein
the valve inner surface is configured so that the intersection of the valve with a first plane that is transverse to the valve longitudinal axis defines a first line at the valve inner surface,
the first line is parallel to an axis that is transverse to the valve longitudinal axis, for any location of the first plane between the first end and the second end, and
a second line that is defined by the intersection of a second transverse plane with the valve is parallel to the first line regardless of the axial location of the second transverse plane.

6. The engine exhaust system of claim 1, wherein
the valve is disposed in the exhaust passage such that the valve longitudinal axis is generally parallel to a direction of flow of exhaust gas within the exhaust passage.

7. The engine exhaust system of claim 1, wherein the valve is disposed in the exhaust passage at a location upstream relative to the turbocharger.

8. The engine exhaust system of claim 7, wherein a pilot tube is disposed in the exhaust passage, and the pilot tube is connected to an air intake of the engine via a duct, and is configured to increase pressure of gas introduced into the engine.

9. The engine exhaust system of claim 7, wherein a pilot tube is disposed in the exhaust passage at a location corresponding to the valve, and the pilot tube is connected to an air intake of the engine via a duct, and is configured to increase pressure of gas introduced into the engine.

10. The engine exhaust system of claim 1, comprising a pilot tube disposed in the exhaust passage so as to be aligned with a flow stream of exhaust gas within the exhaust passage, wherein the pilot tube includes
a leading edge facing the flow stream and configured to reduce the velocity of the flow stream,
a pilot tube internal passageway that opens in the leading edge at a location in which the flow stream has a maximum velocity,
wherein the pilot tube internal passageway is connected to an air intake of the engine via duct, and when exhaust gas flows within the exhaust passage past the pilot tube, pressure within the pilot tube internal passageway is increased, whereby pressure of gas introduced into the air intake is increased.

11. The engine exhaust system of claim 10, wherein the pilot tube is located within the exhaust passage at an axial location corresponding to the axial location of the valve.

12. The engine exhaust system of claim 1, wherein
the actuator is connected to the valve via a rod,
the actuator is disposed externally of the exhaust passage, and the rod passes through an opening in a wall of the exhaust passage, a seal is disposed in the opening that provides a seal between the rod and the wall of the exhaust passage,
a pressure drain is provided in the wall of the exhaust passage], and
the pressure drain opens adjacent the seal.

13. The engine exhaust system of claim 12, wherein the seal comprises a first piston ring and a second piston ring that are disposed in the opening and provide a labyrinth seal between the rod and the wall of the exhaust passage, and the pressure drain opens between the first piston ring and the second piston ring.

14. The engine exhaust system of claim 1, further comprising at least one of the engine and the turbocharger.

15. The engine exhaust system of claim 1, wherein the valve inner surface is spaced apart from a facing surface of the exhaust passage, regardless of valve position.

16. An engine exhaust system for an engine that is coupled to a turbocharger, the engine exhaust system comprising
an exhaust passage that connects the turbocharger to an exhaust of the engine;
a valve disposed in the exhaust passage, the valve configured to generate pressure to drive high pressure exhaust gas recirculation to the engine, the valve including
a first end that faces a flow of exhaust gas within the exhaust passage;
a second end opposed to the first end;
a valve longitudinal axis that extends through both the first end and the second end;
a valve outer surface that is configured to conform to the shape and dimensions of the exhaust passage; and
a valve inner surface that has a curvilinear profile when viewed in longitudinal cross section; and
an actuator connected to the valve, the actuator configured to move the valve relative to the exhaust passage so as to control exhaust gas pressure within the exhaust passage, wherein the actuator is disposed such that the actuator movement is generally parallel to a direction of flow of exhaust gas within the exhaust passage;
wherein the actuator is connected to the valve via a rod, the actuator is disposed externally of the exhaust passage, and the rod passes through an opening in a wall of the exhaust passage;
wherein the seal comprises a first piston ring and a second piston ring that are disposed in the opening and provide a labyrinth seal between the rod and the wall of the exhaust passage, and the pressure drain opens between the first piston ring and the second piston ring; and,
wherein the pressure drain includes a first end that opens between the first piston ring and the second piston ring, and a second end that opens in the exhaust passage at a location disposed between the turbocharger and an exhaust after-treatment device.

17. A valve configured to control the flow of fluid in a passageway, the valve comprising
a first end that faces a flow of fluid within the passageway;
a second end opposed to the first end;
a valve longitudinal axis that extends through both the first end and the second end;
a valve outer surface that is configured to conform to the shape and dimensions of the passageway; and
a valve inner surface that has a curvilinear profile when viewed in longitudinal cross section;
wherein the entire valve is constructed and arranged to move longitudinally in the passageway.

18. The valve of claim 17, wherein the valve inner surface defines a converging portion that adjoins the first end and a diverging portion disposed between the converging portion and the second end.

19. The valve of claim 17, wherein the valve inner surface defines a first concave portion adjoining the first end, a second concave portion adjoining the second end, and a convex portion disposed between the first concave portion and the second concave portion.

20. The valve of claim 19, wherein the valve inner surface defines a smoothly curving surface.

21. The valve of claim 17, wherein
the valve inner surface is configured so that the intersection of the valve with a first plane that is transverse to the valve longitudinal axis defines a first line at the valve inner surface,
the first line is parallel to an axis that is transverse to the valve longitudinal axis, for any location of the first plane between the first end and the second end, and
a second line that is defined by the intersection of a second transverse plane with the valve is parallel to the first line regardless of the axial location of the second transverse plane.

* * * * *